July 21, 1953 T. J. MAAS 2,646,182
LOADING AND UNLOADING APPARATUS
Filed Dec. 1, 1950 3 Sheets-Sheet 1

INVENTOR.
THEODORE J. MAAS
BY
Oberlin & Limbach
ATTORNEYS.

July 21, 1953  T. J. MAAS  2,646,182
LOADING AND UNLOADING APPARATUS
Filed Dec. 1, 1950  3 Sheets-Sheet 2
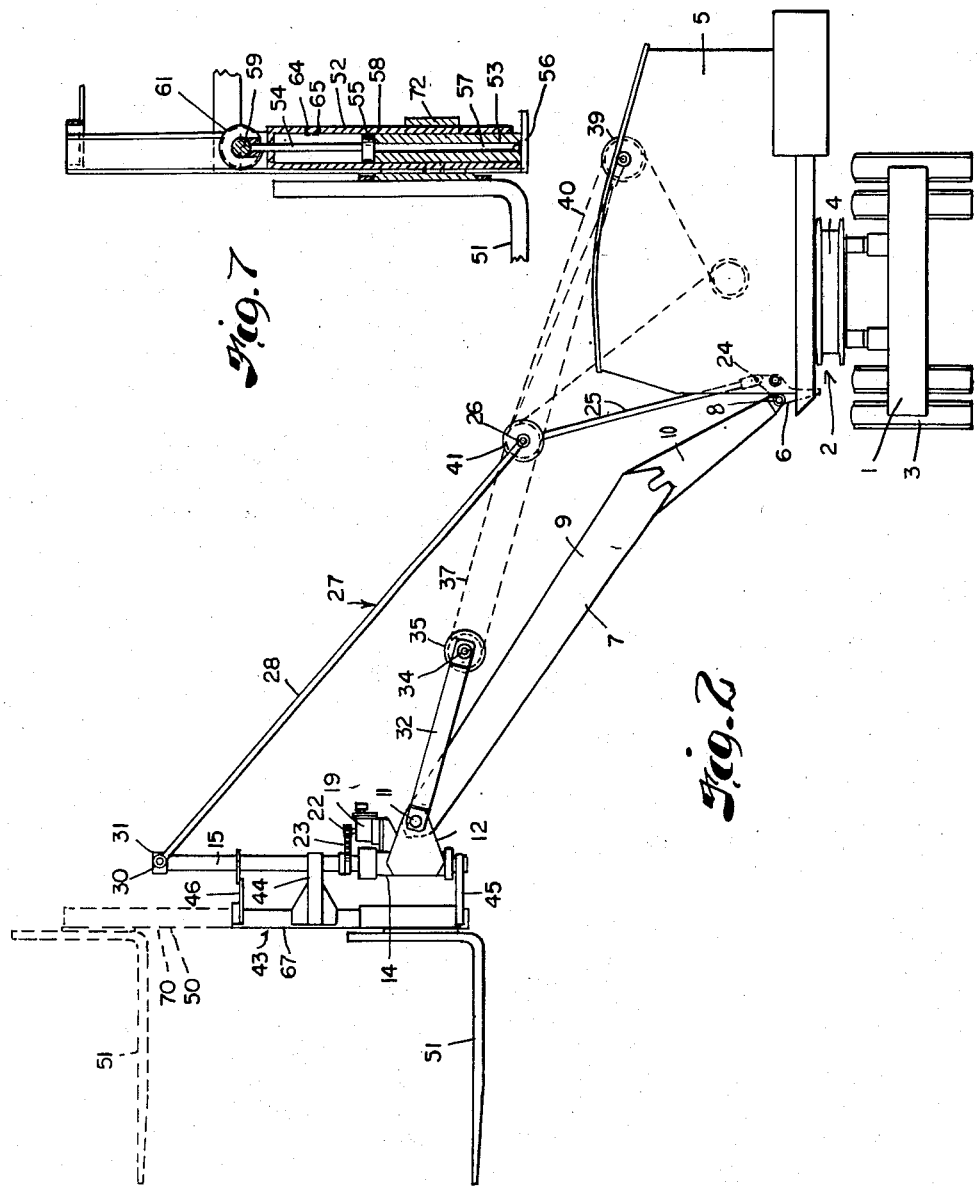
INVENTOR.
THEODORE J. MAAS
BY
Oberlin & Limbach
ATTORNEYS.

July 21, 1953  T. J. MAAS  2,646,182
LOADING AND UNLOADING APPARATUS
Filed Dec. 1, 1950  3 Sheets-Sheet 3

INVENTOR.
THEODORE J. MAAS
BY
Oberlin & Limbach
ATTORNEYS.

Patented July 21, 1953

2,646,182

UNITED STATES PATENT OFFICE 2,646,182

LOADING AND UNLOADING APPARATUS

Theodore J. Maas, Detroit, Mich., assignor, by mesne assignments, to The Thew Shovel Company, Lorain, Ohio, a corporation of Ohio Application December 1, 1950, Serial No. 198,579

3 Claims. (Cl. 214—660)

This invention relates as indicated to loading and unloading apparatus and more particularly to apparatus adapted to raise and lower large heavy objects and transport the same laterally while suspended.

Unloading operations from ships and railroad cars and the like are ordinarily accomplished by a crane consisting of tackle rigged at the end of a beam rotatable about a vertical axis. However, such devices have a number of rather serious disadvantages, one such being that the same are not adapted to prevent twisting and swinging of the object while suspended. Furthermore, the height to which an article may be lifted is restricted to the elevation of the beam from which such tackle is suspended.

It is accordingly a primary object of this invention to provide loading and unloading apparatus having hoisting mechanism which is adapted to be very closely controlled, whereby to prevent swinging and turning of the object suspended.

Another object is to provide apparatus employing hoisting mechanism which may be raised and lowered independently of the rest of the apparatus.

Another object is to provide means for maintaining said hoisting mechanism in substantially vertical position irrespective of the position of the rest of the apparatus.

Still another object is to provide hoisting mechanism capable of limited turning movement independently of the rest of the apparatus.

A further object is to provide loading and unloading apparatus which is safe and easy to operate and efficient in the performance of its intended function.

Other objects of the invention will become apparent as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a side elevation of the apparatus shown in Fig. 1;

Fig. 7 is a vertical sectional view of the mechanism employed to raise and lower the lifting platform.

Broadly stated, my invention consists of a rigid elongated member pivotally anchored for oscillation in a vertical plane, hoisting mechanism connected thereto, and means holding said hoisting mechanism in substantially vertical position irrespective of the position of said member, said hoisting mechanism comprising a lifting platform movable vertically relative to such point of connection.

Within the broad statement of the invention as set out above, there are, of course, various specific forms which may be provided to embody the same, these differing mainly with regard to the specific form of the hoisting mechanism and manner of connection thereof with such elongated member. As illustrated and described herein, such hoisting mechanism comprises an hydraulically operated lifting fork adapted to travel in guides along a telescoping frame and is mounted on a boom adjacent the end thereof for turning movement about a vertical axis.

Figure 1:
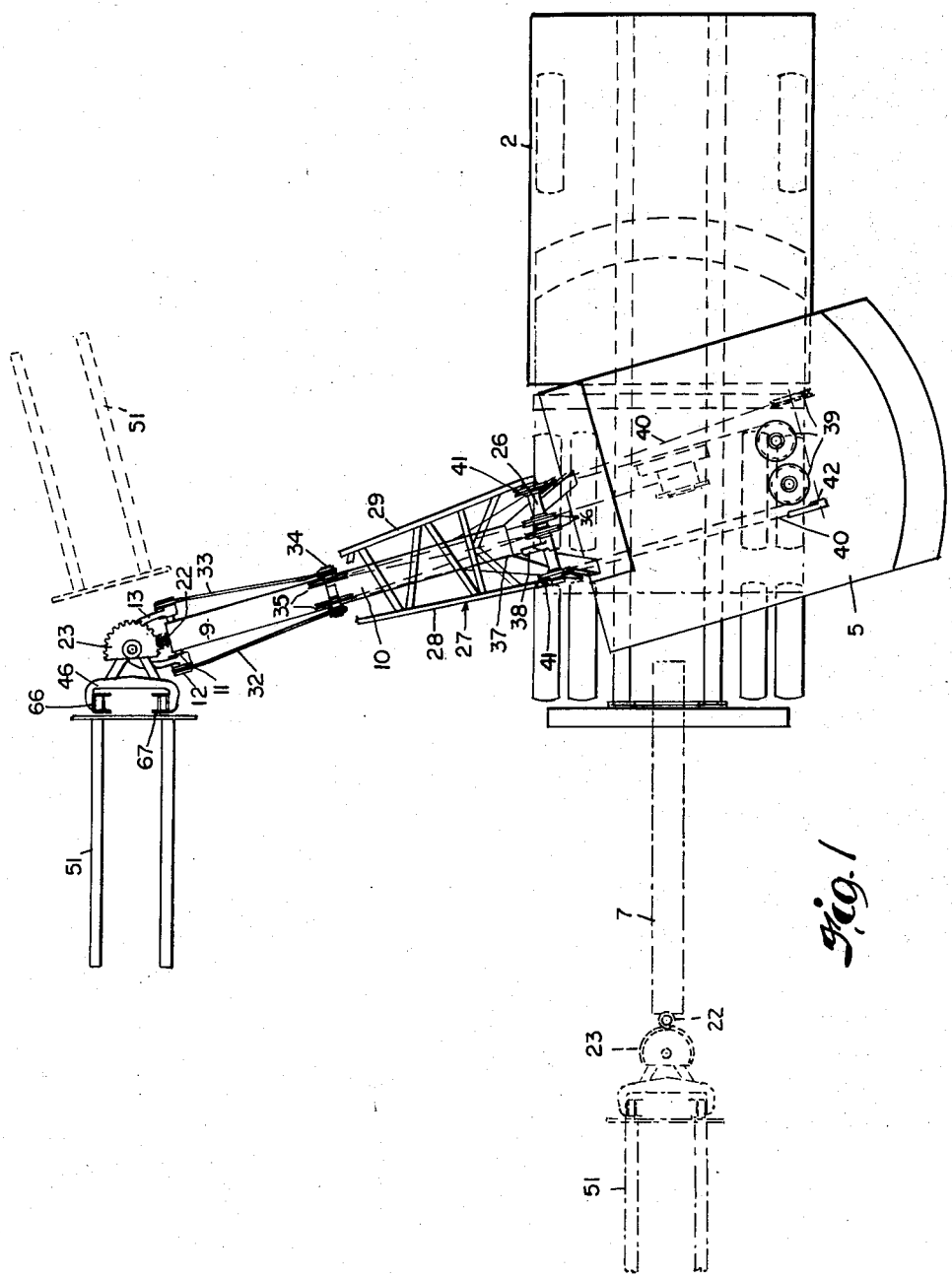
Fig. 1 is a top plan view of apparatus embodying my invention shown mounted upon a truck.
Figure 5:
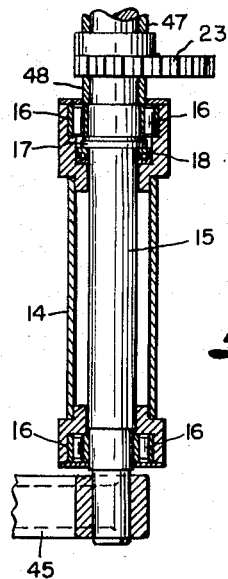
Fig. 5 is a sectional view taken along the line 5—5 on Fig. 4.
Figure 3:
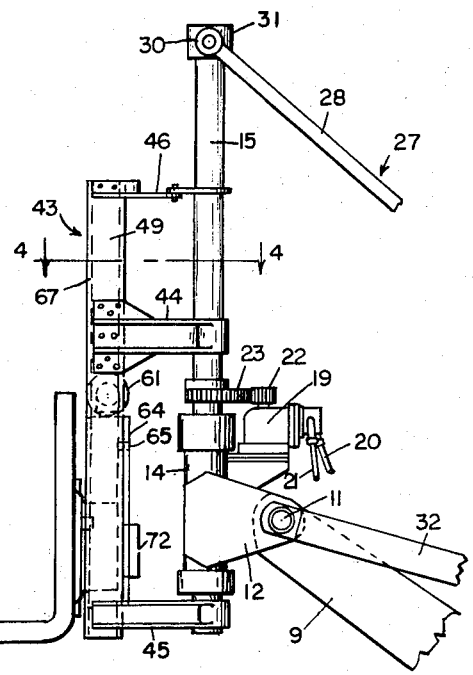
Fig. 3 is an enlarged view in side elevation of a portion of the mechanism embodying my invention.
Figure 6:
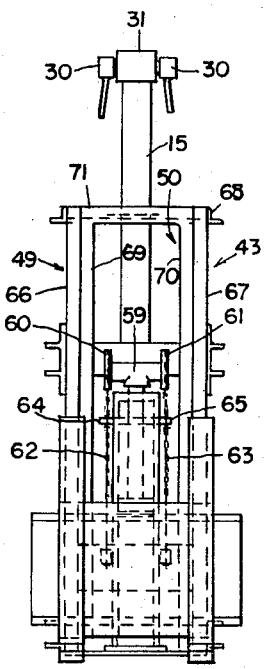
Fig. 6 is an end elevation of the apparatus illustrated in Fig. 3 as viewed from the left thereof.
Figure 4:
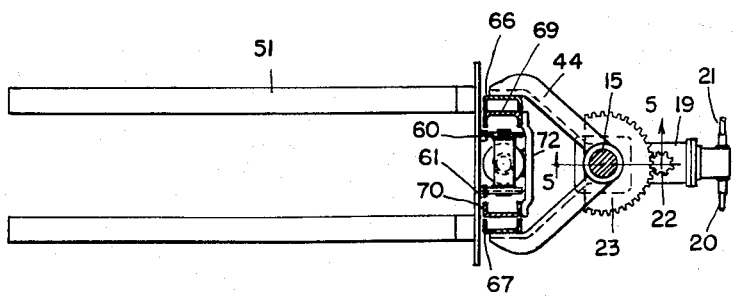
Fig. 4 is a sectional view taken along the line 4—4 on Fig. 3.

Referring now to the drawing and more particularly to Figs. 1 and 2 thereof, apparatus embodying my invention is there shown mounted upon the deck 1 of a truck 2 supported by wheels 3. A vertically extending supporting member 4 is mounted on such deck carrying a cabin 5 for turning movement thereon. Such cabin supports the loading and unloading apparatus of my invention and houses the control mechanism necessary to operate the same as well as to control movement of the truck. The truck mounting provided for such loading and unloading apparatus is not essential to the satisfactory operation thereof but is desirably provided to permit the unlimited lateral movement of objects while supported thereby.

A bracket 6 securely fastened to the lower front portion of cabin 5 pivotally supports a boom 7 at 8, such boom comprising two rigid members 9 and 10 fixedly secured together end to end to form a rigid structure. A horizontally extending cross-member 11 is carried by boom 7 at the outer extremity thereof to which are pivotally secured ears 12 and 13 of sleeve 14. A vertically extending mast 15 is suitably supported by sleeve 14 for turning movement therein by roller bearings 16. Such mast is adapted to carry hoisting mechanism, hereinafter described, and is provided with an annular shoulder 17 supported by thrust bearings 18 to prevent axial movement thereof relative to sleeve 14. Rigidly secured to such sleeve is a housing 19 which contains a fluid pressure actuated motor of suitable construction supplied by fluid pressure lines 20 and 21 from a pump (not shown). Such motor is adapted to turn pinion 22 extending vertically from such housing through a limited number of turns. In mesh with pinion 22 is a gear sector 23 keyed to mast 15 whereby to effect rotation of the latter within the limits of such gear sector. It will be noted that gear sector 23 is continuous for slightly more than 180°, thereby permitting a like amount of turning movement of the mast.

Pivotally secured to bracket 6 at 24 is an upright member 25 provided at its upper extremity with a cross-member 26. A framework 27 comprising a pair of interconnected converging elongated members 28 and 29 is adapted to maintain mast 15 in desired position about the axis of cross-member 11. The corresponding ends of members 28 and 29 are pivotally mounted on opposite outer extremities of cross-member 26 and adjacent their converging ends such members are pivotally attached to lugs 30 secured to sleeve 31, the latter embracing the upper extremity of mast 15 for rotative movement relative thereto.

A pair of rigid members 32 and 33 pivotally connected to cross-member 11 supported at the outer end of boom 7 are connected together at their free extremities by cross-member 34 carrying pulleys 35. Likewise, a pair of pulleys 36 is carried by cross-member 26 at the upper extremity of upright 25. A cable 37 secured at one end to lug 38 on member 26 is trained over such pulleys and extended into cabin 5 for actuation thereof by suitable mechanism therein. Raising and lowering of the boom in a vertical plane may thus be accomplished by suitable mechanism within the cabin.

Pulleys 39 mounted atop the cabin have trained thereover a cable 40 likewise trained over pulleys 41 carried at the outer extremity of cross-member 26. One end of cable 40 is secured to lug 42 fixed to the upper surface of cabin 5, the other end extending into such cabin for actuation by suitable mechanism therein, whereby the upright 25 may be adjusted to desired position about its pivot 24. As may be seen to advantage in Fig. 2 of the drawing, the apparatus embodying my loading and unloading mechanism is so arranged and constructed that the quadrilateral defined by the members 11, 24, 26 and 30 is a parallelogram. It may also be seen that mast 15 is disposed in substantially vertical position and it is clear that such mast will remain vertically disposed irrespective of the position of boom 7 about its pivot 8. Of course, since upright 25 is pivotally supported by the cabin, adjustments may be made in the mechanism by means of cable 40 which controls the position of such upright.

Hoisting mechanism, generally indicated at 43, is carried by mast 15 being connected thereto by means of V-shaped brackets 44 and 45 which have sleeves formed at the point of convergence thereof embracing and rigidly secured to such mast. Another bracket 46 carried by the upper portion of such mechanism is secured to the mast in similar fashion. Spacers 47 and 48 on mast 15 are interposed between bracket 44 and gear sector 23, and between the latter and the upper portion of sleeve 14, respectively, to insure proper spacing of such members.

Such hoisting mechanism comprises a vertically extending framework, including a main structure 49 and a structure 50 adapted to telescope in the main structure. This framework provides a guide for a lifting platform 51 adapted to move vertically along the framework and to support loads to be carried by the structure. The lifting platform 51 is adapted to be elevated and lowered by a suitable hydraulic mechanism which includes a cylinder 52 slidably mounted on vertical support 53 and a piston rod 54 actuated by a piston 55 in the cylinder. An oil pump and suitable valve mechanism, not shown, are provided whereby oil may be forced through line 56 and passage 57 formed in vertical support 53 for raising and lowering the piston. It will be noted that piston 55 is slightly recessed on its underside at 58, in order to facilitate actuation of the same when in its lowest position in engagement with the upper portion of support 53. A transversely extending axle 59, carried by the end of piston rod 54 supports sprockets 60 and 61 mounted at the opposite ends thereof. Chains 62 and 63 are trained over respective sprockets, one end of the chains being secured to ears 64 and 65 on cylinder 52, and the opposite ends of the chains being attached to lifting platform 51. Thus, when the piston is raised and lowered, the lifting platform will be raised and lowered correspondingly.

The frame structure 49 comprises two vertically extending members 66 and 67 which are spaced apart in fixed relation by means of the brackets connecting the same to mast 15 as well as by cross member 68. The members 66 and 67 are preferably channel shaped with the open sides thereof facing one another for receiving, respectively, channel members 69 and 70 of the frame structure 50. The channel members 69 and 70 are secured together at their upper ends by cross member 71 and adjacent their lower ends by yoke 72. The latter member is likewise rigidly secured, as by means of welding, to cylinder 52. Preferably the members 69 and 70 form a guide for rollers, not shown, attached to lifting platform 51, which rollers cooperate with the guide for moving the lifting platform in a vertical path.

As fluid pressure builds up in the passage 57 against the recessed undersurface of piston 55, the latter is caused to move upwardly thereby elevating lifting platform 51. The distance travelled by such lifting platform will obviously be twice that of piston 55. With the hoisting mechanism in collapsed or completely telescoped position, as shown in solid lines in Fig. 2, the sprockets 60 and 61 carried at the end of piston rod 54 will approach the upper cross member 71 of the inner frame structure 50 at the upper limit of its stroke without, however, contacting such cross member. As pressure continues to build up within cylinder 52, the latter, being slidably mounted on support 53 will itself advance upwardly together with inner frame structure 50 secured to such cylinder by means of yoke 72. Thus, cylinder 52, piston rod 54 together with sprockets 60 and 61 carried thereby, inner frame structure 50, and lifting platform 51 will be elevated as a unit. Stop means are provided to limit the upward movement of cylinder 52 relative to its vertical support 53.

Having thus described apparatus embodying my invention, the operation of the same becomes readily apparent. Thus, if such apparatus is desired to be employed to unload a railroad car, for example, the truck will be conveniently positioned adjacent such car and the cabin 5 rotated about its supporting pivot to cause boom 7 to bridge the gap therebetween. By means of cable 37, the boom may be elevated or lowered about its pivot 8, and hoisting mechanism 43 positioned properly with respect to mast 15 by means of a suitable fluid pressure actuated motor within housing 19, whereby lifting platform 51 may be inserted beneath an object to be lifted. Fluid under pressure may then be supplied to cylinder 52 to cause such lifting platform to be elevated with respect to mast 15. By proper manipulation of the means controlling the apparatus thus described, the hoisting mechanism and object carried thereby may be swung clear of the railroad car and moved to an unloading station. The cycle may then be repeated until the entire car is unloaded. It is clear of course that if the hoisting mechanism 43 is slightly inclined to the vertical, the same may be corrected by adjustment of upright 25 by means of cable 40 whereby to properly position such hoisting mechanism with respect to the rest of the apparatus.

It is clear from the foregoing that I have provided loading and unloading apparatus which is capable of raising and lowering large and heavy objects, transporting them laterally while suspended in safe and efficient manner, and comprising hoisting mechanism movable independently of the rest of the apparatus.

Although I have described but one specific form of apparatus to embody my invention, it is clear that various modifications may be made without departing from the broad principle set out above. Thus, for example, many different forms of hoisting mechanism, which I have indicated generally at 43, may be employed within the broad scope and contemplation of my invention. Likewise the manner in which the same is connected to the mast 15 or similar apparatus may be varied. While hydraulic fluid such as oil may ordinarily be employed to turn the hoisting mechanism and raise or lower the lifting platform carried thereby, clearly other means such as pneumatic pressure may be utilized, if desired.

Other modes of applying the principle of the invention may be empolyed, change being made as regards the details described, provided the features stated in any of the following claims, or the equivalent of such, be employed.

I therefore particularly point out and distinctly claim as my invention:

1. A load lifting apparatus comprising a boom, means for supporting said boom for vertical and horizontal movement of the free end thereof, a mast pivotally mounted at its lower end on the free end of the boom, linkage means for adjusting the pivoted position of the mast and holding the mast in a selected adjusted position regardless of the vertical and horizontal position of the free end of the boom, guide elements mounted on the mast substantially parallel thereto, a load lifting platform slidably mounted on the guide elements, means for raising said platform independently of the movement of the free end of the boom and means for swinging the guide elements about the longitudinal axis of the mast to provide horizontal swinging movement for the platform independently of movement of the free end of the boom.

2. A load lifting apparatus as set forth in claim 1, wherein the linkage means includes a pair of links having a common pivot point, said links being further pivoted at their free ends to the mast and to the boom supporting means, respectively, whereby, upon adjusting the position of the common pivot point of the links, the pivoted position of the mast may be adjusted.

3. A load lifting apparatus as set forth in claim 2, including means in tension connecting the pivot point between the mast and the boom and the common pivot point of the links, whereby the boom may be raised and lowered upon application of force to the means in tension.

THEODORE J. MAAS.

References Cited in the file of this patent

UNITED STATES PATENTS

| Number | Name | Date |
|---|---|---|
| 1,384,768 | Luce | July 19, 1921 |
| 1,457,639 | Straight | June 5, 1923 |
| 1,460,074 | Oldroyd | June 26, 1923 |
| 1,856,082 | Remde | May 3, 1932 |
| 2,348,899 | Guignard et al. | May 16, 1944 |
| 2,554,930 | Ulinski | May 29, 1951 |